United States Patent
Wikman et al.

(10) Patent No.: US 9,112,903 B2
(45) Date of Patent: Aug. 18, 2015

(54) SERVICE DISCOVERY

(75) Inventors: Johan Wilhelm Wikman, Helsingfors (FI); Mikko Tapani Tarkiainen, Espoo (FI)

(73) Assignee: Nokia Corporation, Espoo (FI)

(*) Notice: Subject to any disclaimer, the term of this patent is extended or adjusted under 35 U.S.C. 154(b) by 801 days.

(21) Appl. No.: 12/077,456

(22) Filed: Mar. 17, 2008

(65) Prior Publication Data
US 2009/0234950 A1 Sep. 17, 2009

(51) Int. Cl.
*H04L 29/08* (2006.01)
*H04L 12/28* (2006.01)
*H04L 29/12* (2006.01)
*G06F 15/173* (2006.01)
(Continued)

(52) U.S. Cl.
CPC .............. *H04L 67/16* (2013.01); *G06F 9/5055* (2013.01); *H04L 12/2872* (2013.01); *H04L 29/12113* (2013.01); *H04L 61/1541* (2013.01); *H04W 4/02* (2013.01); *G06F 2209/5015* (2013.01); *H04L 67/18* (2013.01); *H04W 48/18* (2013.01)

(58) Field of Classification Search
CPC ..................................................... H04W 8/005
See application file for complete search history.

(56) References Cited

U.S. PATENT DOCUMENTS

| | | | |
|---|---|---|---|
| 2005/0286478 A1* | 12/2005 | Mela et al. | 370/338 |
| 2006/0099935 A1* | 5/2006 | Gallagher et al. | 455/414.1 |
| 2006/0200541 A1* | 9/2006 | Wikman et al. | 709/223 |
| 2008/0010676 A1 | 1/2008 | Dosa Racz | |

FOREIGN PATENT DOCUMENTS

| | | |
|---|---|---|
| WO | WO 2006/018713 A1 | 2/2006 |
| WO | WO 2006018713 A1 * | 2/2006 |

(Continued)

OTHER PUBLICATIONS

Wikman, et al, "Personal Website on a Mobile Phone," NRC-TR-2006-004, http://research.nokia.com, May 24, 2006.*

(Continued)

*Primary Examiner* — Suraj Joshi
(74) *Attorney, Agent, or Firm* — Harrington & Smith

(57) ABSTRACT

The invention can be used for enabling service discovery. Service discovery can be enabled by requesting, by a first apparatus from a gateway entity, information on apparatuses capable of providing a predetermined service and being located in proximity of the first apparatus, receiving, by the first apparatus from the gateway entity, a predetermined resource identifier associated with a second apparatus capable of providing the predetermined service and being located in proximity of the first apparatus, the predetermined resource identifier being received as a response to the request, and sending, by the first apparatus, a resource request to the second apparatus using the predetermined resource identifier associated with the second apparatus. Service discovery can also be enabled by receiving, by a first apparatus, a resource request sent by a second apparatus using a predetermined resource identifier associated with a wireless service of the first apparatus, wherein the second apparatus is located in proximity of the first apparatus, determining whether the wireless service of the first apparatus is to be made available to the second apparatus, initiating the wireless service at the first apparatus in case it is determined, that the wireless service is to be made available to the second apparatus, creating a response to the resource request, inserting into the response a parameter required for establishing a connection to the wireless service of the first apparatus, and sending the response to the second apparatus.

32 Claims, 3 Drawing Sheets

(51) Int. Cl.
  *G06F 9/50*    (2006.01)
  *H04W 4/02*    (2009.01)
  *H04W 48/18*   (2009.01)

(56) References Cited

FOREIGN PATENT DOCUMENTS

| WO | WO 2006/048706 A1 | | 5/2006 |
| WO | WO 2006048706 A1 | * | 5/2006 |
| WO | WO 2006/129182 A2 | | 12/2006 |
| WO | WO 2007/068486 A2 | | 6/2007 |

OTHER PUBLICATIONS

"Personal Website on a Mobile Phone", Nokia Research Center, Johan Wikman, et al, May 2006, 6 Pages XP-002554051.
Providing HTTP Access to Web Servers Running on Mobile Phones, Johan Wikman, et al, May 2006, 6 Pages, XP-002435345.

* cited by examiner

SERVICE DISCOVERY

FIELD OF THE INVENTION

The invention relates in general to service discovery and in particular, but not exclusively, to discovering a service provider that is located close to the party making the discovery.

BACKGROUND OF THE INVENTION

In addition to voice calls, mobile phones and other wireless devices are also used for data services such that data is retrieved from a data provider via e.g. mobile communication network. Today it is commonplace to e.g. retrieve contents of web pages from servers in the internet for viewing the content in a web browser running on a mobile phone or another wireless device.

Today's mobile phones and other wireless devices are also capable of operating as content providers. For example, a mobile phone can run a mobile web server, the content of which can be made available to virtually anybody who has access to the internet. The content of the mobile web server is accessed from the internet via the mobile communication network, to which the mobile phone or other wireless device that is running the mobile web server is attached, typically through a web gateway. If the mobile web server is accessed through the web gateway, the gateway can e.g. provide the mobile web server related connectivity and security functions. For example, the web gateway can receive HTTP requests directed to the mobile web server and relay the requests to the mobile web server using an address of the mobile web server in the mobile network that is known to the gateway. The gateway can also operate as a firewall.

A user of a mobile phone with a web browser can access the content of a mobile web server run by e.g. another mobile phone in a similar manner as accessing the content of a web server in the internet. That is, the user enters or selects, using the web browser of the mobile phone, the URL (Uniform Resource Locator) associated with the mobile web server, after which the protocol stack software of the mobile connects the mobile phone to the mobile web server and retrieves the requested content. Even if the mobile phone running the mobile web server is located close to the mobile phone requesting the content, e.g. in the same cell, the data communication path between the mobile phones may run a long distance in the network infrastructure of the mobile communication network and reserve two uplink and two downlink channels in the cell where the mobile phones are located. A similar situation may arise when the mobile web server is accessed e.g. from a laptop computer.

Today's mobile phones and other wireless devices are typically also equipped with short range wireless communication modules, such as WLAN (Wireless Local Area Network) and Bluetooth® modules. If a mobile phone accessing a mobile web server and a mobile phone running the mobile web server are located in proximity of each other, the connection between the mobile phones may be established through e.g. WLAN instead of a mobile communication network in order to save costs. However, the user of the mobile phone accessing the mobile web server may not know, whether the mobile phone running the mobile web server is located nearby or whether the WLAN service is started at the web server mobile phone.

SUMMARY

The invention aims at addressing at least some of the issues discussed above. According to a first aspect of the invention there is provided a method that comprises requesting, by a first apparatus from a gateway entity, information on apparatuses capable of providing a predetermined service and being located in proximity of the first apparatus, receiving, by the first apparatus from the gateway entity, a predetermined resource identifier associated with a second apparatus capable of providing the predetermined service and being located in proximity of the first apparatus, the predetermined resource identifier being received as a response to the request, and sending, by the first apparatus, a resource request to the second apparatus using the predetermined resource identifier associated with the second apparatus.

According to a second aspect of the invention there is provided an apparatus comprising a communication interface configured to operate a communication connection, and a processor functionally coupled to the communication interface and configured to send a request through the communication interface to a gateway entity, requesting from the gateway entity information on apparatuses capable of providing a predetermined service and being located in proximity of the apparatus, to receive, from the gateway entity through the communication interface, a predetermined resource identifier associated with another apparatus capable of providing the predetermined service and being located in proximity of the apparatus, the predetermined resource identifier being received as a response to the request, and to send, through the communication interface, a resource request to the other apparatus using the predetermined resource identifier associated with the other apparatus.

According to a third aspect the invention provides a computer program product embodied on a computer-readable medium, the computer program comprising program code operable to be loaded into the memory of and executed on a computing apparatus, the program code having been configured to enable, when executed, the computing apparatus to request, from a gateway entity, information on apparatuses capable of providing a predetermined service and being located in proximity of the computing apparatus, to receive, from the gateway entity, a predetermined resource identifier associated with another apparatus capable of providing the predetermined service and being located in proximity of the computing apparatus, the predetermined resource identifier being received as a response to the request, and to send a resource request to the other apparatus using the predetermined resource identifier associated with the other apparatus.

According to a fourth aspect the invention provides an apparatus comprising communication interface means for operating a communication connection, means for sending a request through the communication interface means to a gateway entity, requesting from the gateway entity information on apparatuses capable of providing a predetermined service and being located in proximity of the apparatus, means for receiving, from the gateway entity through the communication interface means, a predetermined resource identifier associated with another apparatus capable of providing the predetermined service and being located in proximity of the apparatus, the predetermined resource identifier being received as a response to the request, and means for sending, through the communication interface means, a resource request to the other apparatus using the predetermined resource identifier associated with the other apparatus.

According to a fifth aspect of the invention there is provided a method that comprises receiving, by a first apparatus, a resource request sent by a second apparatus using a predetermined resource identifier associated with a wireless service of the first apparatus, wherein the second apparatus is located in proximity of the first apparatus, determining whether the wireless service of the first apparatus is to be made available to the second apparatus, initiating the wireless service at the first apparatus in case it is determined, that the wireless service is to be made available to the second apparatus, creating a response to the resource request, inserting into the response a parameter required for establishing a connection to the wireless service of the first apparatus, and sending the response to the second apparatus.

According to a sixth aspect the invention provides an apparatus comprising a communication interface configured to operate a communication connection, and a processor functionally coupled to the communication interface and configured to receive via the communication interface a resource request sent by another apparatus using a predetermined resource identifier associated with a wireless service of the apparatus, wherein the other apparatus is located in proximity of the apparatus, to determine whether the wireless service of the apparatus is to be made available to the other apparatus, to initiate the wireless service at the apparatus in case it is determined, that the wireless service is to be made available to the other apparatus, to create a response to the resource request, to insert into the response a parameter required for establishing a connection to the wireless service of the apparatus, and to send the response to the other apparatus.

According to a seventh aspect of the invention there is provided a computer program product embodied on a computer-readable medium, the computer program comprising program code operable to be loaded into the memory of and executed on a computing apparatus, the program code having been configured to enable, when executed, the computing apparatus to receive a resource request sent by another apparatus using a predetermined resource identifier associated with a wireless service of the computing apparatus, wherein the other apparatus is located in proximity of the computing apparatus, to determine whether the wireless service of the computing apparatus is to be made available to the other apparatus, to initiate the wireless service at the computing apparatus in case it is determined, that the wireless service is to be made available to the other apparatus, to create a response to the resource request, to insert into the response a parameter required for establishing a connection to the wireless service of the computing apparatus, and to send the response to the other apparatus.

According to an eighth aspect of the invention there is provided an apparatus comprising communication interface means for operating a communication connection, means for receiving via the communication interface means a resource request sent by another apparatus using a predetermined resource identifier associated with a wireless service of the apparatus, wherein the other apparatus is located in proximity of the apparatus, means for determining whether the wireless service of the apparatus is to be made available to the other apparatus, means for initiating the wireless service at the apparatus in case it is determined, that the wireless service is to be made available to the other apparatus, means for creating a response to the resource request, means for inserting into the response a parameter required for establishing a connection to the wireless service of the apparatus, and means for sending the response to the other apparatus.

According to a ninth aspect the invention provides a system comprising a first apparatus arranged to provide a predetermined service, and to send a device identifier of the first apparatus to a gateway entity, a second apparatus arranged to request from the gateway a predetermined resource identifier associated with the first apparatus, the predetermined resource identifier indicating availability of the predetermined service at the first apparatus, and to send a resource request to the first apparatus by using the predetermined resource identifier, and the gateway entity arranged to receive the device identifier from the first apparatus, to associate the device identifier of the first apparatus with a predetermined resource identifier, and to provide the predetermined resource identifier associated with the first apparatus to the second apparatus as a response to the request by the second apparatus.

Various exemplary embodiments of the present invention are illustrated hereinafter in the detailed description of the invention as well as in the dependent claims appended hereto. The embodiments are illustrated with reference to selected aspects of the invention. A person skilled in the art appreciates that any embodiment of the invention may apply to other aspects as well either alone or in combination with other embodiments.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
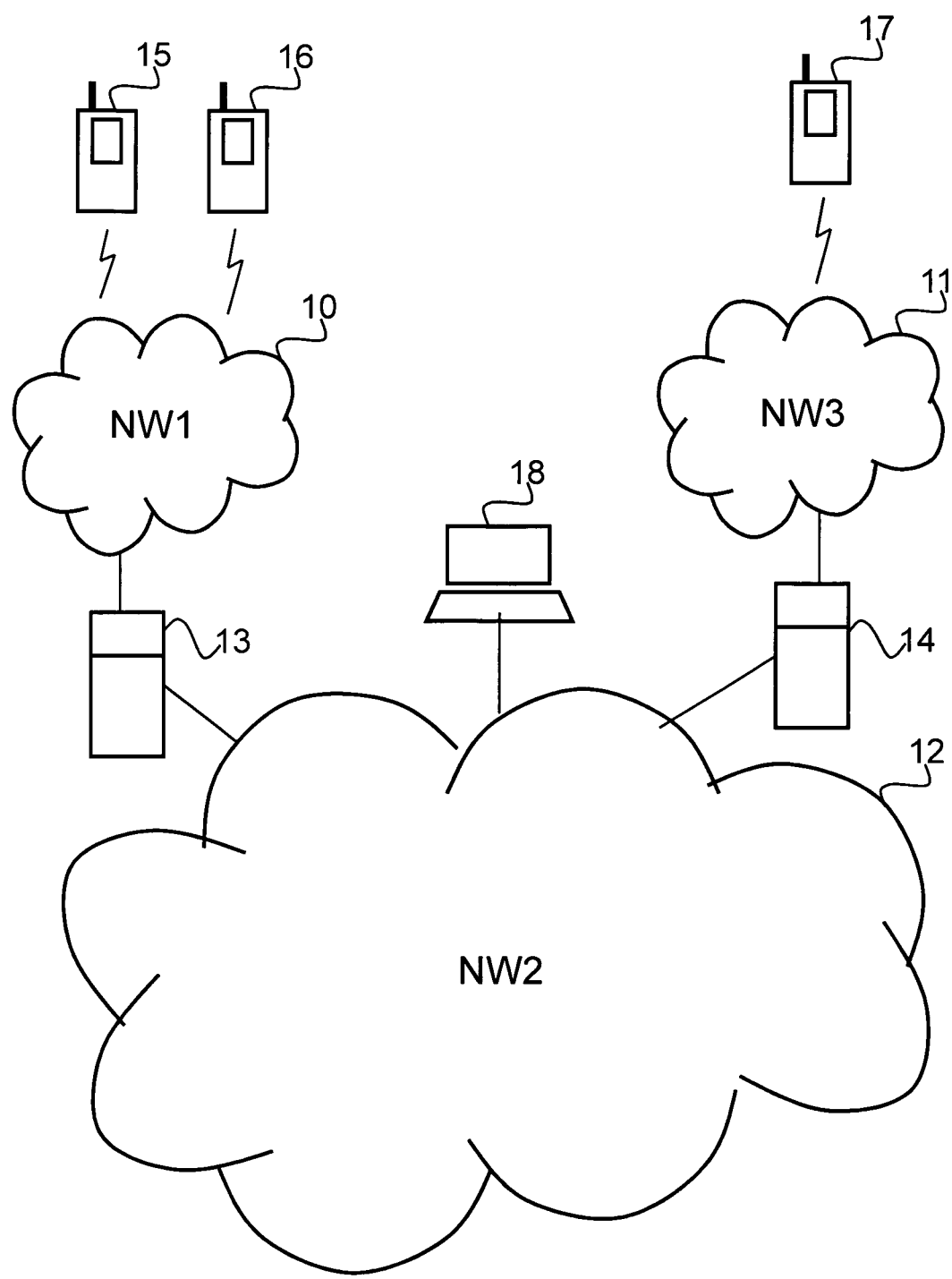
FIG. 1 outlines an example of a system where embodiments of the invention may be used.

Reference is made to FIG. 1 which illustrates an example of a system where embodiments of the present invention may be used. The system of FIG. 1 comprises a first network 10, a second network 12, and a third network 11. The first network 10 and the third network 11 may be e.g. operator networks and the second network may be e.g. the internet. The first network 10 and the third network 11, i.e. the operator networks, may be e.g. mobile communication networks, such as GSM (Global System for Mobile communication), CDMA (Code Division Multiple Access) or IS-95, WCDMA (Wideband Code Division Multiple Access) or UMTS networks. The first network 10 and the third networks may also be local wireless networks, such as WLAN (Wireless Local Area Network) networks. The first network 10 and the third network 11 may be of the same or different type.

FIG. 1 further depicts wireless apparatuses 15, 16 attached to and communicating with/via the first network 10, and a wireless apparatus 17 attached to and communicating with/via the third network 11. FIG. 1 also shows an apparatus 18 attached to the second network 12 through a wired connection. The apparatus 18 may also be attached to the second network 12 via a wireless connection (not shown).

The wireless apparatuses 15, 16, 17, may be e.g. mobile phones, laptop or handheld computers, PDAs (Personal Digital Assistant), or game consoles. The apparatus 18 may be e.g. a desktop, laptop, handheld, or deskside computer.

FIG. 1 further shows gateway entities 13, 14 through which e.g. services running on the wireless apparatuses 15, 16, 17 may be accessed from the second network 12, for example by using the apparatus 18. Furthermore, services running on the wireless apparatuses 15, 16, 17 may also be accessed from another wireless apparatus. For example, the wireless apparatus 17 may access a service running on the wireless apparatus 15, in which case the communication connection between the apparatus 15 and the apparatus 17 passes through the gateway entity 13 and the gateway entity 14.

The gateway entities 13, 14 may be network elements of the first network 10 and the third network 11, respectively. The gateway entities 13, 14 may also be located in the second network 12. The gateway entities 13, 14 may be implemented on separate devices, or they may be implemented on a common device shared by a number of logical network elements. For example, the gateway entities 13, 14 may be implemented on a common device with a radio network base station, such as a WCDMA/UMTS or WLAN base station. The gateway entities 13, 14 may also be co-located with a network element of the second network 12, such as a router.

For example, the wireless apparatuses 15, 16, 17 may each run a mobile web server, which allows an access to web content stored on the wireless apparatuses 15, 16, 17 by using the HTTP (HyperText Transfer Protocol) protocol. In this scenario, the gateway entities 13, 14 are HTTP gateways that may e.g. deliver HTTP requests sent by the apparatus 18 via the second network 12 to the wireless apparatuses 15, 16, 17, and HTTP responses from the wireless apparatuses 15, 16, 17 to the apparatus 18 via the second network 12.

Figure 2:
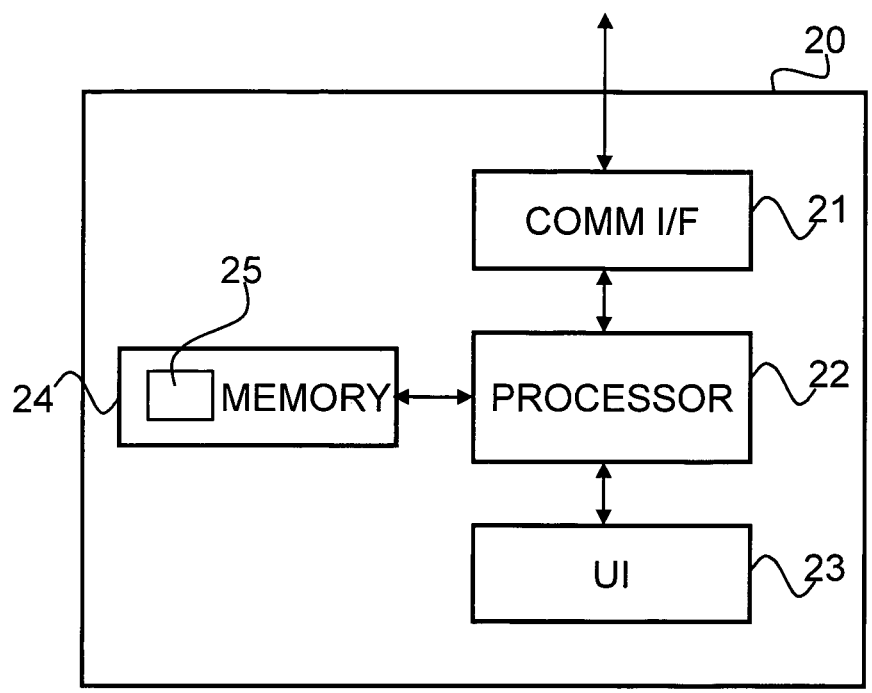
FIG. 2 outlines an example of a general structure of an apparatus, where embodiments of the invention may be implemented.

Reference is now made to FIG. 2, which outlines a general structure of an apparatus 20 on which embodiments of the invention may be implemented. The general structure of the apparatus 20 depicted in FIG. 2 applies to the apparatuses 15, 16, 17, and 18, as well as to devices on which the gateway entities 13, 14 of FIG. 1 are implemented.

The general structure of the apparatus 20 of FIG. 2 comprises a communication interface module 21, a processor 22 coupled to the communication interface module 21, and a memory 24 coupled to the processor 22. The apparatus further comprises a computer program 25 stored in the memory 24 and operable to be loaded into and executed in the processor 22, which enables the apparatus 20 to operate according to the embodiments of the invention.

In case the apparatus 20 represents a user device, such as the wireless apparatuses 15, 16, 17 and the apparatus 18 shown in FIG. 1 and described hereinbefore, the apparatus 20 may further comprise a user interface controller 23 coupled to the processor 22.

The communication interface module 21 may be e.g. a radio interface module, such as a WLAN, Bluetooth, GSM/GPRS, CDMA, or WCDMA radio module, or a module for a wired interface connection, such as a LAN interface module. The communication interface module 21 may be integrated into the apparatus 20 or into an adapter, card or the like that may be inserted into a suitable slot or port of the apparatus 20. The communication interface module 21 may support one radio or wired interface technology or a plurality of technologies. FIG. 2 shows one communication interface module 21, but the apparatus 20 may comprise a plurality of communication interface modules 21, possibly representing different communication technologies.

The processor 22 may be e.g. a central processing unit (CPU), a microprocessor, a digital signal processor (DSP), a graphics processing unit, or the like. FIG. 2 shows one processor 22, but the apparatus 20 may comprise a plurality of processors. The apparatus 20 may e.g. comprise a baseband processor and a multimedia processor.

The memory 24 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a memory or smart card, such as a SIM or USIM card, or the like. The apparatus 20 may comprise a plurality of memories 24. The memory 24 may be constructed as a part of the apparatus 20 or it may be inserted into a slot, port, or the like of the apparatus 20 by a user. The memory 24 may serve the sole purpose of storing data, or it may be constructed as a part of an apparatus serving other purposes, such as processing data.

If the apparatus 20 includes a user interface controller 23, the user interface controller 23 may comprise circuitry for receiving input from a user of the apparatus 20 e.g. via a keyboard, graphical user interface shown on the display of the apparatus 20, speech recognition circuitry, or an accessory device, such as a headset, and for providing output to the user via e.g. a graphical user interface or a loudspeaker.

In addition to the elements shown in FIG. 2, the apparatus 20 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 3:
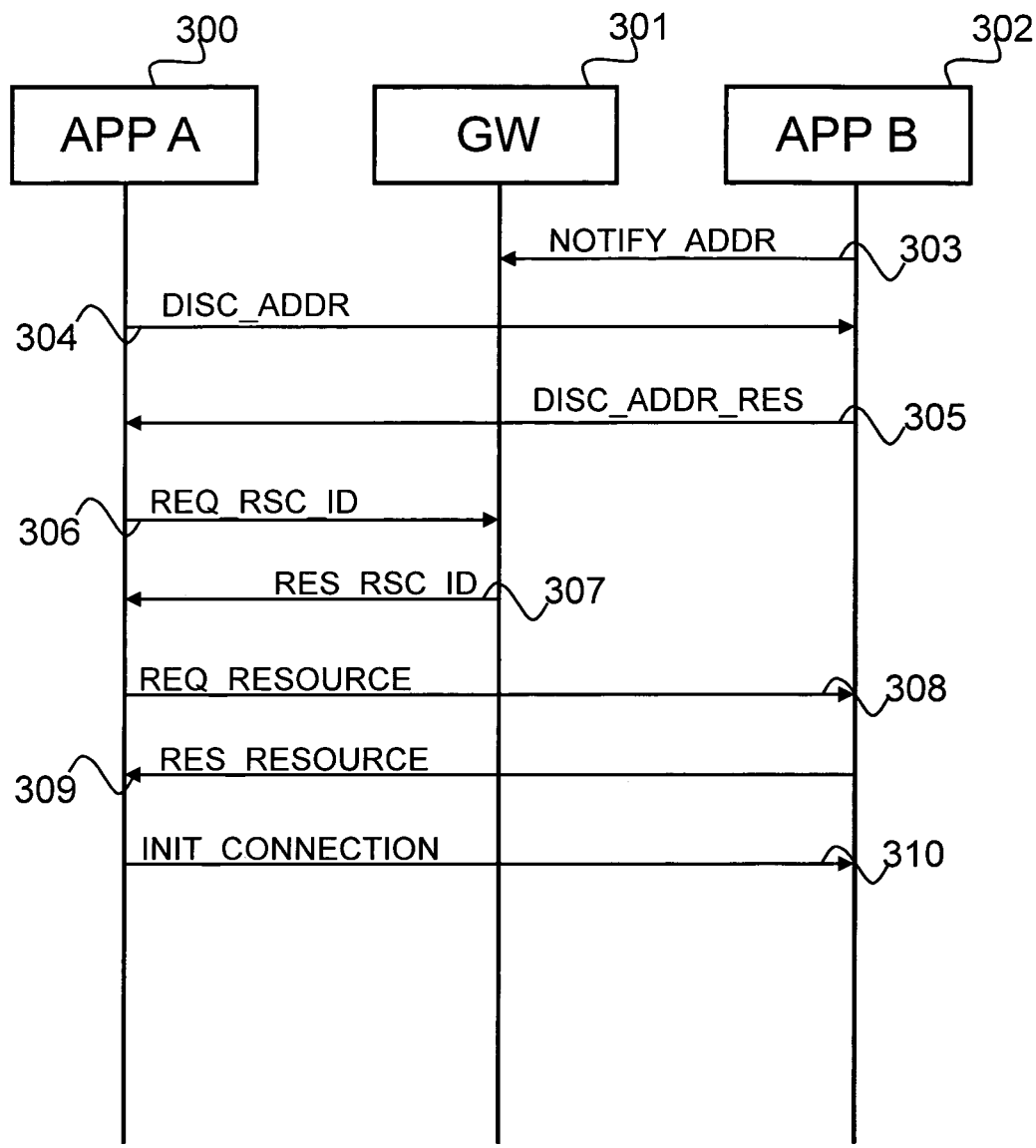
FIG. 3 illustrates an example of messages exchanged between some network elements according to an embodiment of the invention.

Reference is now made to FIG. 3, which illustrates an example of message exchange between a number of network elements according to an embodiment of the invention. FIG. 3 shows two apparatuses 300, 302 and a gateway entity 301. The system of the two apparatuses 300, 302 and the gateway entity 301 depicted in FIG. 3 may correspond e.g. to that of the wireless apparatuses 15, 16 and the gateway entity 13 of FIG. 1.

In step 303, the apparatus B 302 may notify the gateway entity 301 of its device identifier associated with a particular wireless service. The device identifier may be for example the apparatus B's 302 Bluetooth® Device Address (BDA). In a similar manner, the apparatus A 300 may notify the gateway entity 301 of a device identifier used by the apparatus A 300, such as a BDA.

In step 304, the apparatus A 300 may perform a device discovery by using e.g. a wireless service in order to discover other apparatuses located in proximity of the apparatus A 300. The apparatus A may perform e.g. a Bluetooth device discovery in order to discover Bluetooth-capable apparatuses located within the range of the Bluetooth service and configured to respond to the device discovery query. In step 305, the apparatus B may respond to the device discovery message and insert its device identifier, such as its BDA, into the response message.

In step 306, the apparatus A 300 may request from the gateway entity 301 information on apparatuses that are capable of providing a predetermined service and are located in proximity of the apparatus A 300. For example, the apparatus A 300 may request from the gateway entity 301 information on apparatuses that are running a web server service and located close to the apparatus A 300. Another apparatus may be deemed to be in proximity of the apparatus A 300, if the other apparatus is within the range of a wireless service, such as WLAN service, from the apparatus A 300.

The information request of step 306 may be effected e.g. by the apparatus A 300 sending a message to the gateway entity 301, notifying the gateway of its location. The apparatus A 300 may determine its position e.g. by using a GPS (Global Positioning System) receiver operating on the apparatus A 300, or the apparatus A 300 may use the identifier of the mobile network base station or the WLAN base station to which the apparatus A 300 is attached. In a similar manner, the apparatus B 302 may determine and inform the gateway entity of its location.

The information request of step 306 may also be effected by the apparatus A 300 sending the device identifier of the apparatus B 302 received in step 305 to the gateway entity 301. In a similar manner, the apparatus A 300 may receive the device identifiers of other apparatuses located in proximity of the apparatus A 300.

The gateway entity 301 may be configured to receive and store information on e.g. the location of the apparatus A 300 and the apparatus B 302 in a manner that the gateway entity 301 is capable of determining whether the apparatus A 300 and the apparatus B 302 are located in proximity of each other. The gateway entity 301 may further be configured to receive and store information on particular services running on the apparatus A 300 and the apparatus B 302. For example, in an embodiment of the invention where the gateway entity 301 is a HTTP gateway and where the apparatus A 300 and the apparatus B 302 are both running a web server, HTTP requests and responses sent to and received from the apparatus A 300 and the apparatus B 302 pass through the gateway entity 301, which means that the gateway entity is aware of the condition that the apparatus A 300 and the apparatus B is running a web server. The gateway entity 301 may also be configured to store an association between the location of and the services running on the apparatus A 300 and the apparatus B 302.

In step 307 of FIG. 3, the gateway entity 301 may send a response to the request sent by the apparatus A 300 in step 306. The response 307 may include a predetermined resource identifier of an apparatus providing a predetermined service and located in proximity of the apparatus A 300. As described hereinbefore, the gateway entity 301 may maintain an association between an apparatus' location and its available services. In the embodiment of the invention shown in FIG. 3, the gateway entity 301 may insert a predetermined resource identifier associated with the apparatus B 302 into the response that is sent to the apparatus A 300 in step 307.

The predetermined resource identifier sent in step 307 by the gateway entity 301 and received by the apparatus A 300, may be e.g. an HTTP URL (Uniform Resource Locator), which is unique for the apparatus B 302 and may include an indication of the predetermined service provided by the apparatus B 302. For example, the HTTP URL associated with the apparatus B 302 may include a portion that indicates the availability of the predetermined service. The URL associated with the apparatus B 302 may be e.g. http://apparatus-B.example.com/wlan, where the portion 'wlan' indicates, that the web server running on the apparatus 302 may be accessed via a WLAN connection established to the apparatus B 302.

In step 308 of FIG. 3, the apparatus A 300 may send a resource request to the apparatus B 302 by using the predetermined resource identifier associated with the apparatus B 302. For example, the apparatus B 300 may send an HTTP request to the apparatus B 302 by using the HTTP URL of the apparatus B 302. The resource request may be sent e.g. via the gateway entity 301. Referring to FIG. 1, the resource request may be sent via the network 10 and pass through the gateway entity 13. The resource request may include an indication of an application service that the apparatus A 300 wishes to access at the apparatus B 302.

In step 309 of FIG. 3, the apparatus B 302 may create and send a response to the resource request sent by the apparatus A 300 and received by the apparatus B in step 308. If the resource request in step 308 is an HTTP request, the response in step 309 is an HTTP response. The HTTP request and the HTTP response may be secured e.g. by transport layer encryption. Then, the request and the response may be referred to as an HTTPS request and an HTTPS response.

The response 309 may include one or more parameters that are required for establishing a wireless connection, such as a WLAN connection, to the apparatus B 302. For example, the response 309 may include an access point name, if the WLAN service of the apparatus B 302 is run in access point mode, an encryption key and the like. The response may also include information on application services that are available at the apparatus B 302 to other apparatuses via a WLAN connection.

Prior to sending the response 309 to the apparatus A 300, the apparatus B may determine whether it wishes to make the predetermined service, such as the web server service via the WLAN connection, available to the apparatus A 300. The determination may include prompting a user of the apparatus B 302 for an acceptance. The user may be prompted e.g. by means of a dialogue displayed on the display of the apparatus 302. The apparatus 302 may also accept the resource request 308, and thus make the predetermined service available, automatically e.g. on the basis of a profile determined by the user of the apparatus B 302.

The apparatus B 302 may also start the wireless service, e.g. the WLAN service, via which the predetermined service, such as the web server service, is to be made available to the apparatus A 300 in case the wireless service is not running. During the process of starting the wireless service, the apparatus B 302 may create and configure a wireless access point, if the wireless service is to be run in access point mode.

In step 310, a wireless connection, such as a WLAN connection, may be established between the apparatus A 300 and the wireless service of the apparatus B 302. The apparatus A 300 may request the wireless connection by means of the one or more parameters received from the apparatus B 302 in step 309. The apparatus A 300 may e.g. request a connection to the wireless access point created during the startup of the wireless service at the apparatus B 302.

The apparatus A 300, the apparatus B 302, and the gateway entity shown in FIG. 3 may have a general structure similar to that of the apparatus 20 illustrated in FIG. 2 and described hereinbefore. The method steps performed by the apparatus A 300 illustrated in FIG. 3 may be performed by the processor 25 and/or the software 24, when executed by the processor, of the apparatus A 300. The method steps performed by the gateway entity 301 may be performed by the processor 25 and/or the software 24, when executed by the processor, of the gateway entity 301. In a similar manner, the method steps performed by the apparatus B 302 of FIG. 3 may be performed by the processor 25 and/or the software 24, when executed by the processor, of the apparatus B 302.

For example, the information request in step 306 may be initiated by a user of the apparatus A 300 e.g. by using an application running on the apparatus A 300. The application, corresponding to the application 25 of FIG. 2, may be configured for discovering apparatuses that provide a predetermined service and are located in proximity of the apparatus A 300, as well as for enabling the establishment of a wireless connection to one or more of the apparatuses providing said service and located nearby. Furthermore, the application may be configured to receive instructions for discovering and connecting to said apparatuses from another applications. For example, the apparatus A 300 of FIG. 3 may comprise a multi-player game that can be played via a web service, and an application according to an embodiment of the invention for discovering and connecting to apparatuses running the game and making it available to other apparatuses via a web service.

In this scenario, a user of the apparatus A 300 may use the application for discovering opportunities for playing the game with other users nearby. The multi-player game application may also include an option for finding other players. In this case, the multi-player game application may invoke the application according to an embodiment of the invention for the purpose of discovering and connecting to the apparatuses that the other players are using.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:
   requesting, by a first apparatus from a gateway entity, information on at least one second apparatus capable of providing a predetermined service and being located in proximity of the first apparatus to allow direct wireless connection between the first apparatus and the at least one second apparatus;
   receiving, by the first apparatus from the gateway entity, a predetermined resource identifier associated with the at least one second apparatus capable of providing the predetermined service and located in proximity of the first apparatus to allow direct wireless connection between the first apparatus and second apparatus, wherein the predetermined resource identifier is received as a response to the request; and
   sending, by the first apparatus, a resource request to a first one of the second apparatus using the predetermined resource identifier associated with the second apparatus,
   where the requesting of the information on the at least one second apparatus comprises sending, by the first apparatus, location information of the first apparatus determined by the first apparatus via an identifier of a network base station to which the first apparatus is attached to the gateway entity,
   where the location information of the first apparatus is not determinable by the second apparatus, and
   where communication between the first apparatus and the second apparatus is directly through the gateway entity.

2. A method according to claim 1, further comprising:
   receiving, by the first apparatus, a response to the resource request from the second apparatus, wherein the response includes a parameter required for establishing the wireless connection as a first type of wireless connection to the second apparatus; and
   establishing the wireless connection of the first type to the second apparatus using the parameter included in the response received from the second apparatus.

3. A method according to claim 2, wherein the predetermined resource identifier associated with the second apparatus indicates the availability of the second apparatus for the wireless connection of the first type.

4. A method according to claim 3, wherein the wireless connection of the first type is a WLAN connection.

5. A method according to claim 2, wherein the parameter comprises an access point identifier.

6. A method according to claim 2, wherein the parameter comprises a security key.

7. A method according to claim 1, further comprising:
   performing, by the first apparatus, a device discovery by using a wireless connection of a second type;
   receiving a device identifier used by the second apparatus via the wireless connection of the second type, the device identifier being associated with the wireless connection of the second type; and
   inserting the device identifier of the second apparatus into the request sent to the gateway entity.

8. A method according to claim 7, wherein the wireless connection of the second type is a Bluetooth connection.

9. A method according to claim 1, wherein the resource request comprises an indication of an application service that the first apparatus intends to access on the second apparatus by using the wireless connection as a first type of wireless connection.

10. A method according to claim 1, wherein the requesting of the information on at least one second apparatus is initiated by a user of the first apparatus.

11. A method according to claim 1, wherein the requesting of the information on at least one second apparatus is initiated by an application running on the first apparatus.

12. A method according to claim 1, wherein the predetermined resource identifier is a URL.

13. A method according to claim 1, wherein the predetermined service is a mobile web server service.

14. An apparatus comprising:
    a communication interface configured to operate a communication connection; and
    a processor functionally coupled to the communication interface and configured to:
    send a request through the communication interface to a gateway entity, requesting from the gateway entity information on at least one second apparatus capable of providing a predetermined service and being located in proximity of the apparatus to allow direct wireless connection between the apparatus and the second apparatus, where the request to the gateway entity includes information notifying the gateway entity of location of the apparatus, the location of the apparatus being determined by the apparatus via an identifier of a network base station to which the apparatus is attached;
    receive, from the gateway entity through the communication interface, a predetermined resource identifier associated with the second apparatus capable of providing the predetermined service and located in proximity of the apparatus, the predetermined resource identifier being received as a response to the request; and to
    send, through the communication interface, a resource request to the second apparatus using the predetermined resource identifier associated with the second apparatus;
    where the location information of the apparatus is not determinable by the second apparatus, and
    where communication between the first apparatus and the second apparatus is directly through the gateway entity.

15. An apparatus according to claim 14, wherein the processor is further configured to:
receive, through the communication interface, a response to the resource request from the second apparatus, wherein the response includes a parameter required for establishing the wireless connection of a first type to the second apparatus; and to
establish the wireless connection as a first type of wireless connection to the second apparatus using the parameter included in the response received from the second apparatus.

16. An apparatus according to claim 15, wherein the processor is further configured to:
access a service on the second apparatus via the wireless connection of the first type.

17. An apparatus according to claim 14, wherein the processor is further configured to:
perform an apparatus discovery by using a wireless connection of a second type;
receive a device identifier of the second apparatus via the wireless connection of the second type, the device identifier being associated with the wireless connection of the second type; and to
insert the device identifier of the second apparatus into the request sent to the gateway entity.

18. An apparatus according to claim 14, wherein the apparatus further comprises a user interface controller functionally coupled to the processor, and wherein the processor is further configured to:
initiate the requesting of the information on the at least one second apparatus as a response to instructions received from a user of the apparatus via the user interface controller.

19. An apparatus according to claim 14, wherein the processor is further configured to:
initiate the requesting of the information on the at least one second apparatus as a response to instructions received from an application being executed by the processor.

20. A computer program product embodied on a non-transitory computer-readable medium, the computer program comprising program code operable to be loaded into the memory of and executed on a computing apparatus, the program code having been configured to enable, when executed, the computing apparatus to:
request, from a gateway entity, information on second apparatuses both capable of providing a predetermined service and being located in proximity of the computing apparatus to allow direct wireless connection between the computing apparatus and the second apparatuses, where the request to the gateway entity includes information notifying the gateway entity of location of the apparatus, the information notifying the gateway entity of the location of the apparatus being determined by the computing apparatus via an identifier of a network base station to which the computing apparatus is attached;
receive, from the gateway entity, a predetermined resource identifier associated with the second apparatus, wherein the predetermined resource identifier corresponds to the second apparatus which is both capable of providing the predetermined service and only located in proximity of the computing apparatus to allow direct wireless connection between the computing apparatus and the second apparatus, the predetermined resource identifier being received as a response to the request; and to
send a resource request to the second apparatus using the predetermined resource identifier associated with the second apparatus;
where the information notifying the gateway entity of the location of the apparatus being determined is not determinable by the second apparatus, and
where communication between the first apparatus and the second apparatus is directly through the gateway entity.

21. An apparatus comprising:
communication interface means for operating a communication connection;
means for sending a request through the communication interface means to a gateway entity, requesting from the gateway entity information regarding second apparatuses capable of providing a predetermined service and being located in proximity of the apparatus to allow for direct wireless communication between the apparatus and at least one of the second apparatus, where the means for sending the request is configured to send information to the gateway entity in the request which notifies the gateway entity of location of the apparatus, the information notifying the gateway entity of the location of the apparatus being determined by the apparatus via an identifier of a network base station to which the apparatus is attached;
means for receiving, from the gateway entity through the communication interface means, a predetermined resource identifier associated with the at least one apparatus capable of providing the predetermined service and being located in proximity of the apparatus to allow for direct wireless communication between the apparatus and the at least one second apparatus, the predetermined resource identifier being received as a response to the request; and
means for sending, through the communication interface means, a resource request to the at least one second apparatus using the predetermined resource identifier associated with the at least one second apparatus;
where the location information of the apparatus is not determinable by the at least one second apparatus, and
where communication between the first apparatus and the second apparatus is directly through the gateway entity.

22. A method comprising:
receiving, by a first apparatus, from a gateway entity a resource request sent by a second apparatus using a predetermined resource identifier associated with a wireless service of the first apparatus, wherein the resource request is only received by the first apparatus from the gateway entity if the second apparatus is located in proximity of the first apparatus to allow for a subsequent wireless communication between the first apparatus and the second apparatus without use of the gateway entity;
determining whether the wireless service of the first apparatus is to be made available to the second apparatus;
initiating the wireless service at the first apparatus based upon the resource request received from the gateway entity by using the predetermined resource identifier in case it is determined, that the wireless service is to be made available to the second apparatus;
creating a response to the resource request;
inserting into the response a parameter required for establishing a connection to the wireless service of the first apparatus; and
sending the response to the second apparatus;
wherein a location of the first apparatus is not determinable by the second apparatus, and
wherein communication between the first apparatus and the second apparatus is through a mobile web server using HTTP.

23. A method according to claim 22, further comprising:
receiving a request for the wireless connection to the wireless service of the first apparatus from the second apparatus, wherein the request includes the parameter required for establishing the wireless connection; and
establishing the wireless connection directly between the wireless service and the second apparatus.

24. A method according to claim 22, wherein the initiating of the wireless service comprises creating a wireless access point, and wherein the method further comprises:
receiving from the second apparatus a request for the wireless connection to the wireless access point; and
establishing the wireless connection between the wireless access point and the second apparatus.

25. A method according to claim 22, wherein the resource request includes an indication of an application service that the second apparatus intends to access on the first apparatus via the wireless service.

26. A method according to claim 22, wherein the response to the resource request includes indication of an application service available at the first apparatus to another apparatus.

27. An apparatus comprising:
a communication interface configured to operate a communication connection; and
a processor functionally coupled to the communication interface and configured to:
receive from a gateway entity via the communication interface a resource request sent by another apparatus using a predetermined resource identifier associated with a wireless service of the apparatus, wherein the resource request is only received by the apparatus from the gateway entity if the other apparatus is located in proximity of the apparatus to allow for wireless communication between the first apparatus and the second apparatus without use of the gateway entity;
determine whether the wireless service of the apparatus is to be made available to the other apparatus;
initiate the wireless service at the apparatus based upon the resource request received from the gateway entity by using the predetermined resource identifier in case it is determined, that the wireless service is to be made available to the other apparatus;
create a response to the resource request;
insert into the response a parameter required for establishing the wireless connection to the wireless service of the apparatus; and to
send the response to the other apparatus;
wherein a location of the apparatus is not determinable by the other apparatus, and
wherein communication between the first apparatus and the second apparatus is through a mobile web server using HTTP.

28. An apparatus according to claim 27, wherein the processor is further configured to:
receive a request for the wireless connection to the wireless service from the other apparatus, wherein the request includes the parameter required for establishing the connection; and
establishing the wireless connection between the wireless service and the other apparatus.

29. An apparatus according to claim 27, wherein the processor is further configured to:
create a wireless access point during the initiating of the wireless service;
receive from the other apparatus a request for the wireless connection to the wireless access point; and to
establish the wireless connection between the wireless access point and the second apparatus.

30. A computer program product embodied on a non-transitory computer-readable medium, the computer program comprising program code operable to be loaded into the memory of and executed on a computing apparatus, the program code having been configured to enable, when executed, the computing apparatus to:
receive from a gateway entity a resource request sent by another apparatus using a predetermined resource identifier associated with a wireless service of the computing apparatus, wherein the resource request is only received by the computing apparatus from the gateway entity if the other apparatus is located in proximity of the computing apparatus to allow for wireless communication between the first apparatus and the second apparatus without use of the gateway entity;
determine whether the wireless service of the computing apparatus is to be made available to the other apparatus;
initiate the wireless service at the computing apparatus based upon the resource request received from the gateway entity and by using a predetermined resource identifier in case it is determined, that the wireless service is to be made available to the other apparatus;
creating a response to the resource request;
inserting into the response a parameter required for establishing the wireless connection to the wireless service of the computing apparatus; and
sending the response to the other apparatus;
wherein a location of the computing apparatus is not determinable by the other apparatus, and
wherein communication between the first apparatus and the second apparatus is through a mobile web server using HTTP.

31. An apparatus comprising:
communication interface means for operating a communication connection;
means for receiving from a gateway entity via the communication interface means a resource request sent by another apparatus using a predetermined resource identifier associated with a wireless service of the apparatus, wherein the resource request is only received by the apparatus from the gateway entity if the other apparatus is located in proximity of the apparatus to allow for wireless communication between the first apparatus and the second apparatus without use of any gateway entity;
means for determining, based at least partially upon the resource request received from the gateway entity, whether the wireless service of the apparatus is to be made available to the other apparatus;
means for initiating the wireless service at the apparatus by using a predetermined resource identifier in case it is determined, that the wireless service is to be made available to the other apparatus;
means for creating a response to the resource request;
means for inserting into the response a parameter required for establishing a connection to the wireless service of the apparatus; and
means for sending the response to the other apparatus;
wherein a location of the apparatus is not determinable by the other apparatus, and
wherein communication between the first apparatus and the second apparatus is through a mobile web server using HTTP.

32. A system comprising:

a gateway entity;

a first apparatus comprising a memory, a processor and communication interface, wherein the first apparatus is arranged to:
  provide a predetermined service; and to
  send a device identifier of the first apparatus to the gateway entity;

a second apparatus arranged to:
  request from the gateway entity a predetermined resource identifier associated with the first apparatus, the predetermined resource identifier indicating availability of the predetermined service at the first apparatus, where the request to the gateway entity includes information notifying the gateway entity of location of the second apparatus and is determined by the first apparatus via an identifier of a network base station to which the first apparatus is attached; and to
  send a resource request to the first apparatus by using the predetermined resource identifier; and wherein the gateway entity is arranged to:
  receive the device identifier from the first apparatus;
  associate the device identifier of the first apparatus with a predetermined resource identifier, wherein the gateway entity is configured to limit association of the device identifier only to the first apparatus which is located within a vicinity of the second apparatus to allow for wireless connection between the first apparatus and the second apparatus without use of any gateway entity; and to
  provide the predetermined resource identifier associated with the first apparatus to the second apparatus as a response to the request by the second apparatus;

where location information of the first apparatus is not determinable by the second apparatus, and where communication between the first apparatus and the second apparatus is through a mobile web server using HTTP.

* * * * *